March 12, 1946.　　　M. WATTER　　　2,396,625
AIRCRAFT STRUCTURE
Filed March 26, 1941　　12 Sheets-Sheet 4
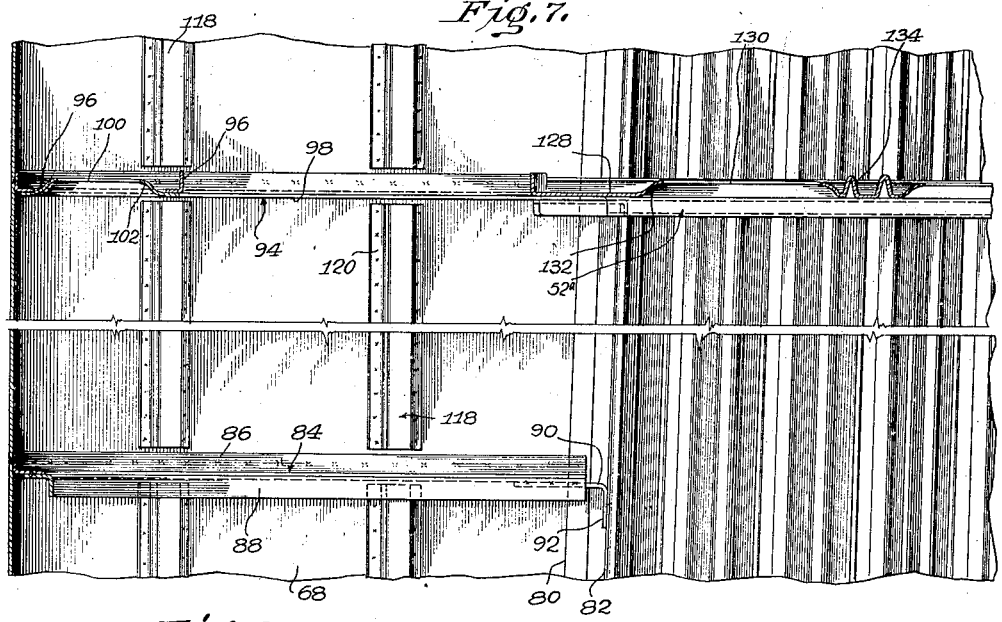
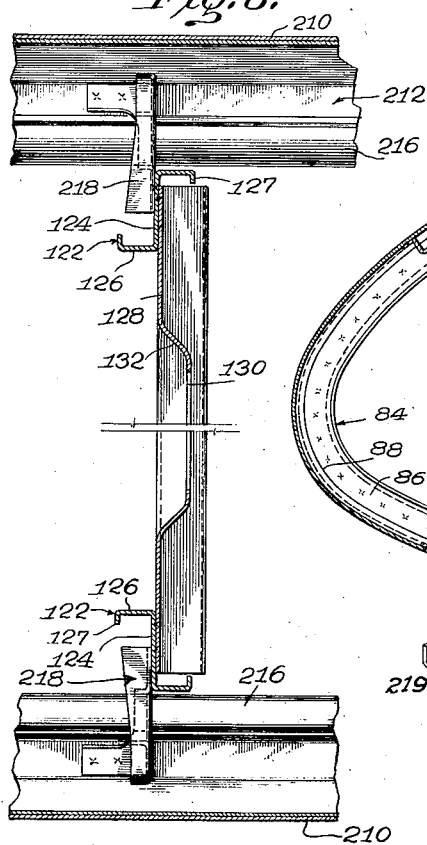
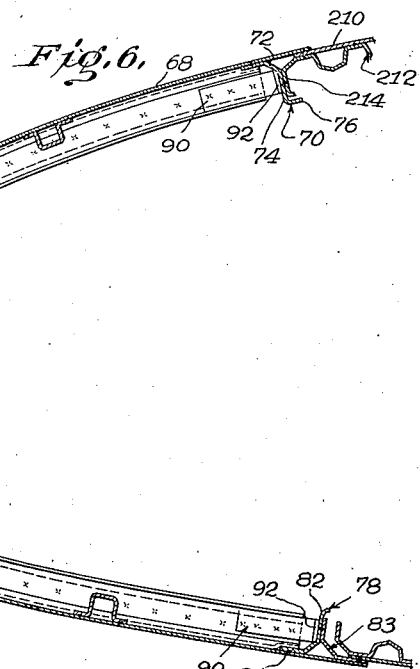
INVENTOR
Michael Watter
BY John P. Tarbox
ATTORNEY

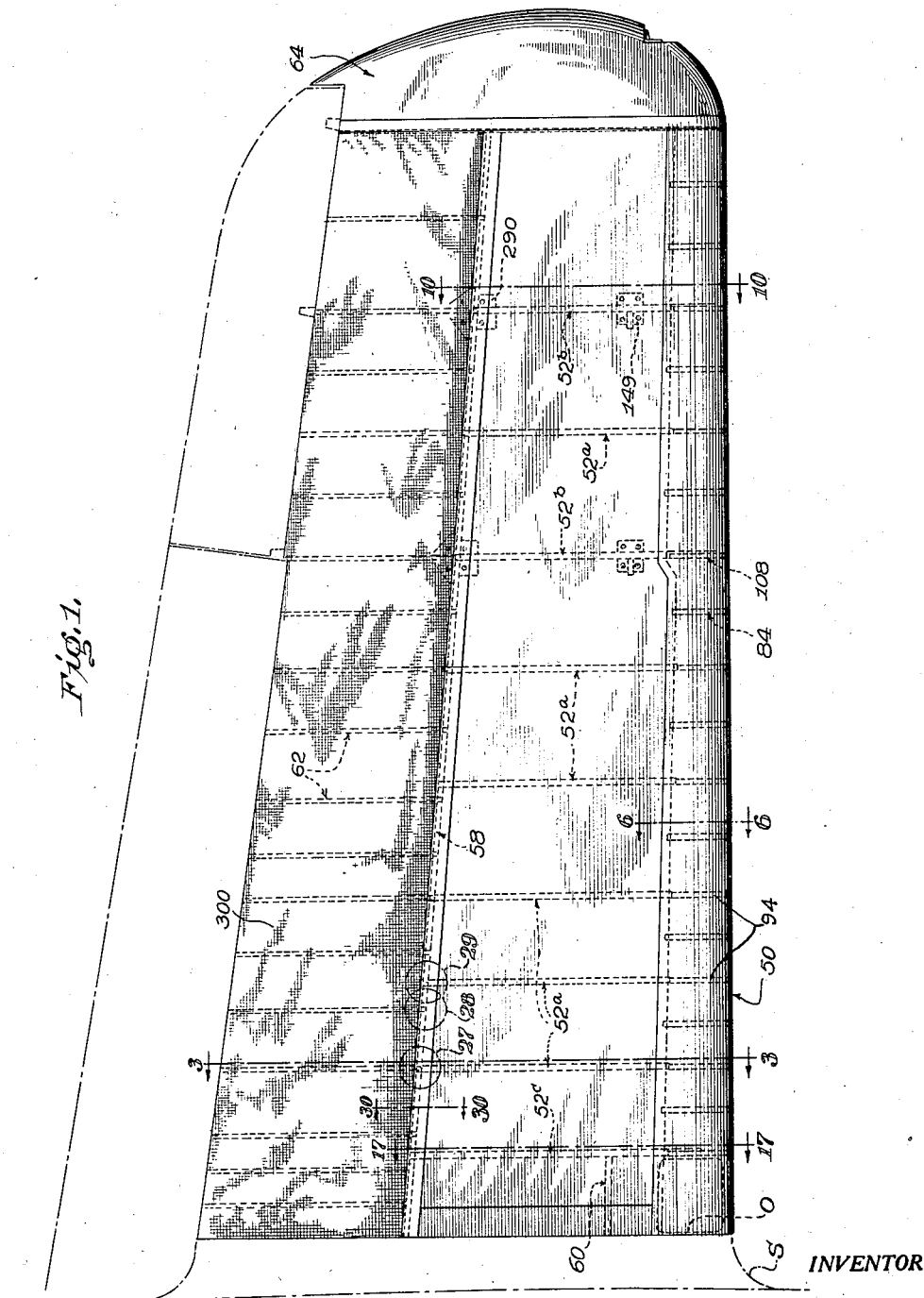

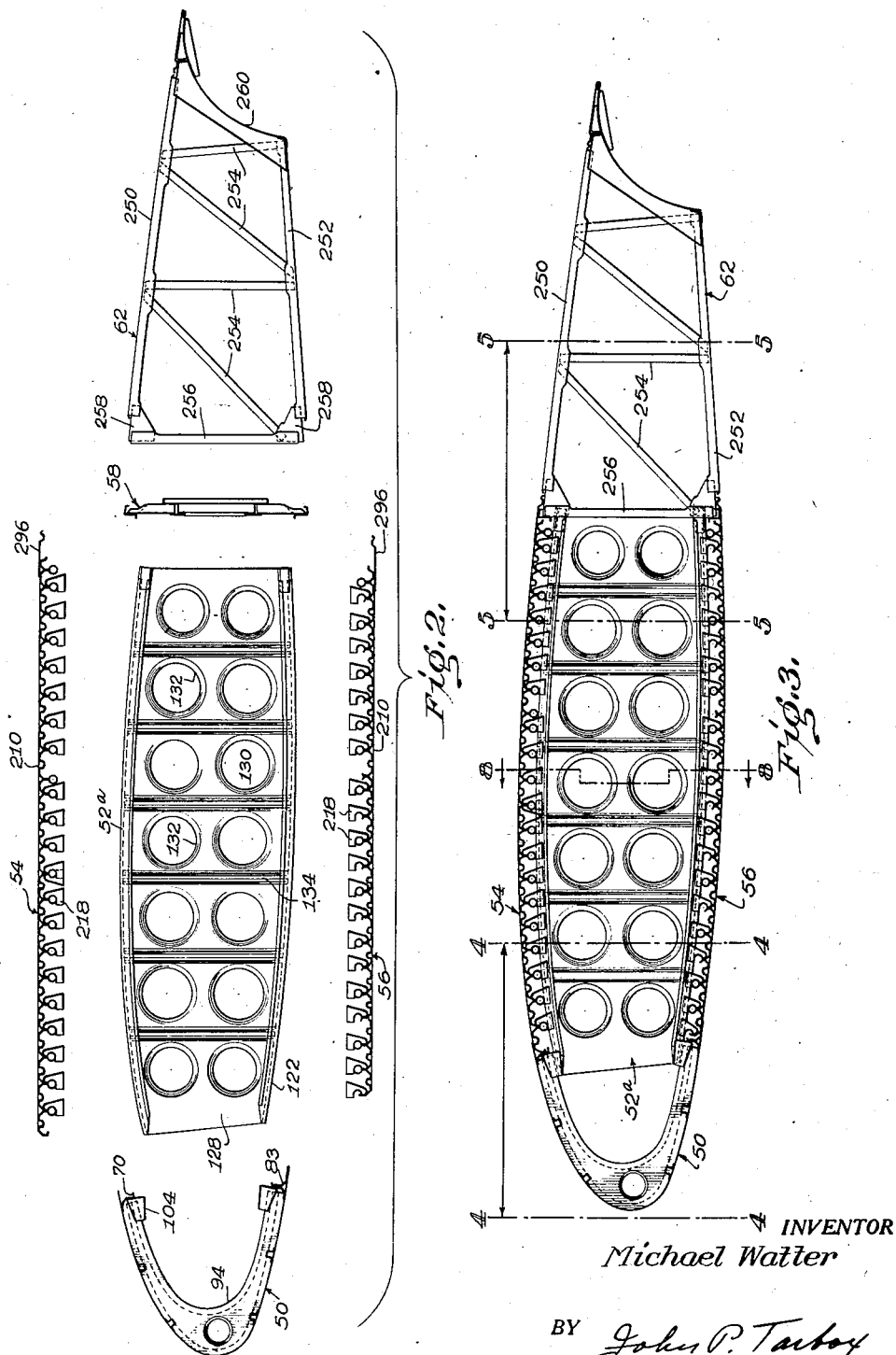

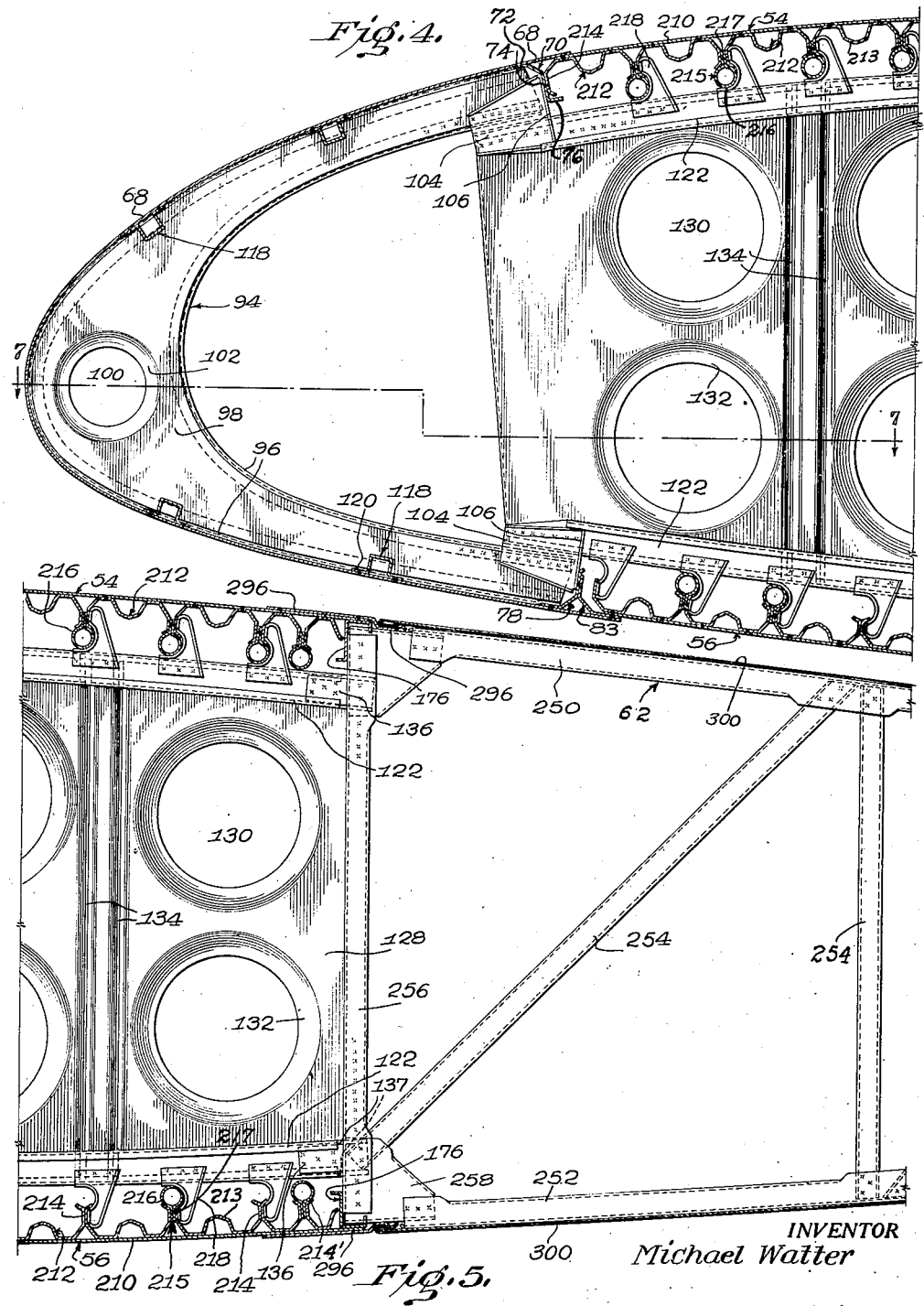

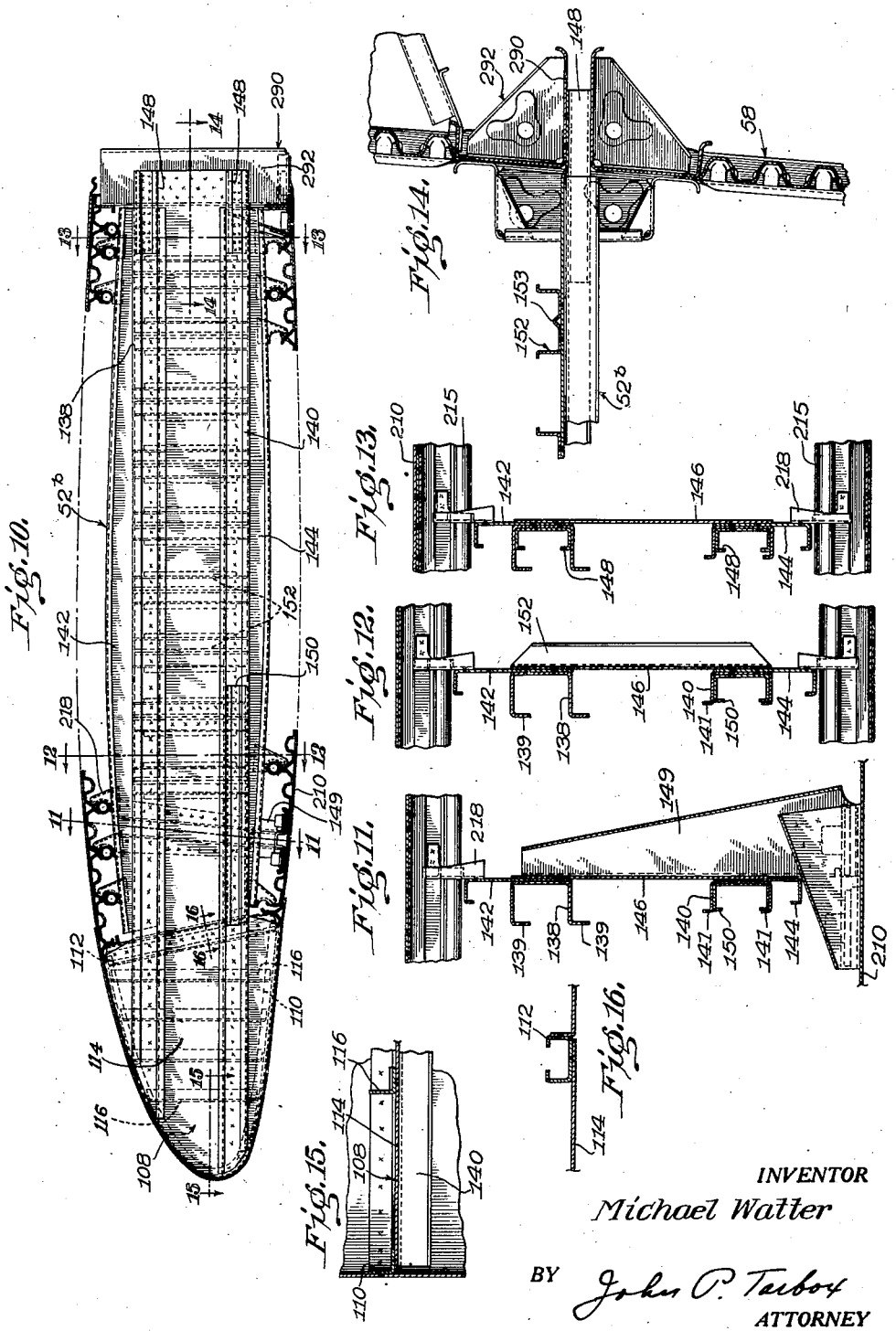

March 12, 1946. M. WATTER 2,396,625
AIRCRAFT STRUCTURE
Filed March 26, 1941 12 Sheets-Sheet 6
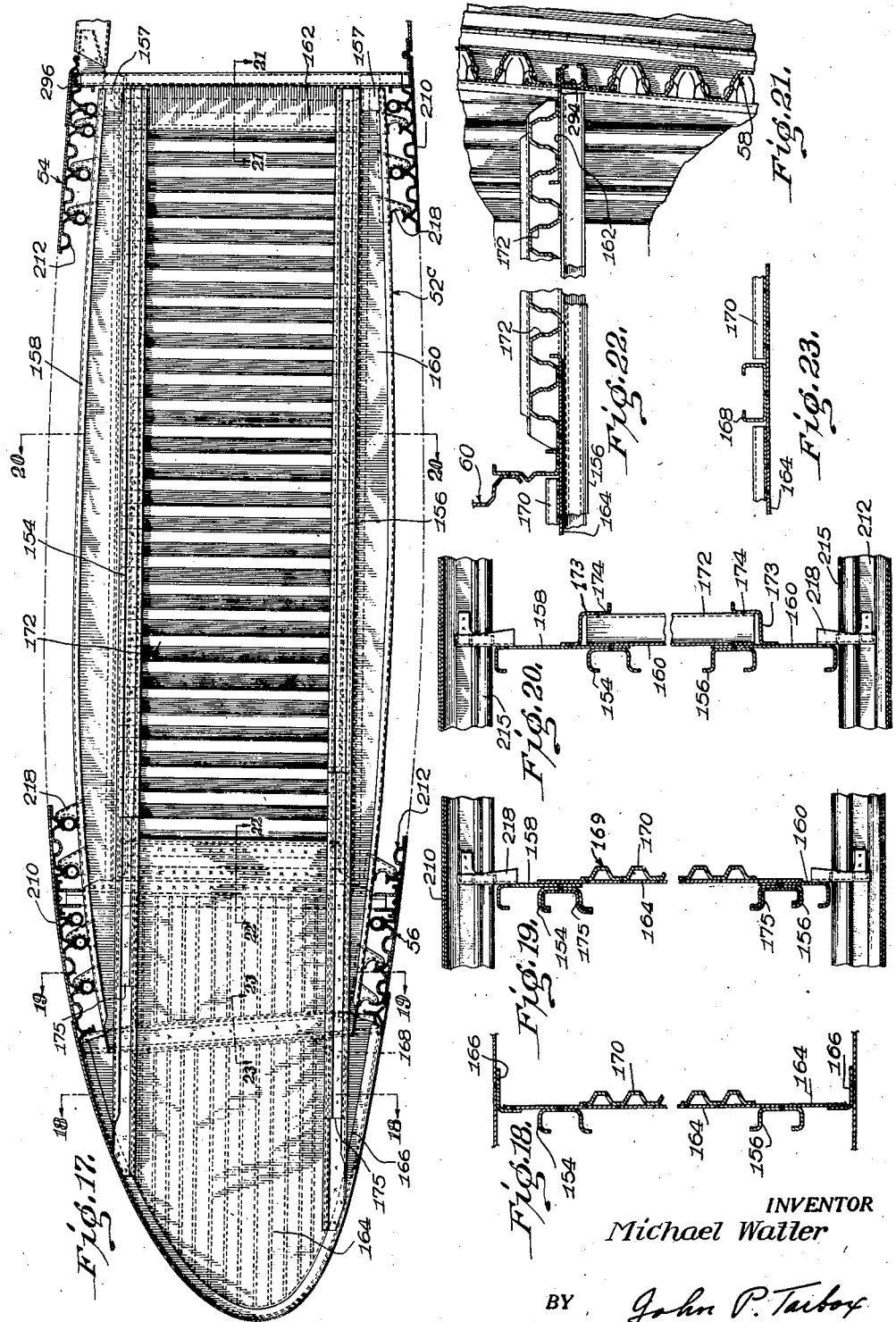
INVENTOR
Michael Watter
BY John P. Tarbox
ATTORNEY

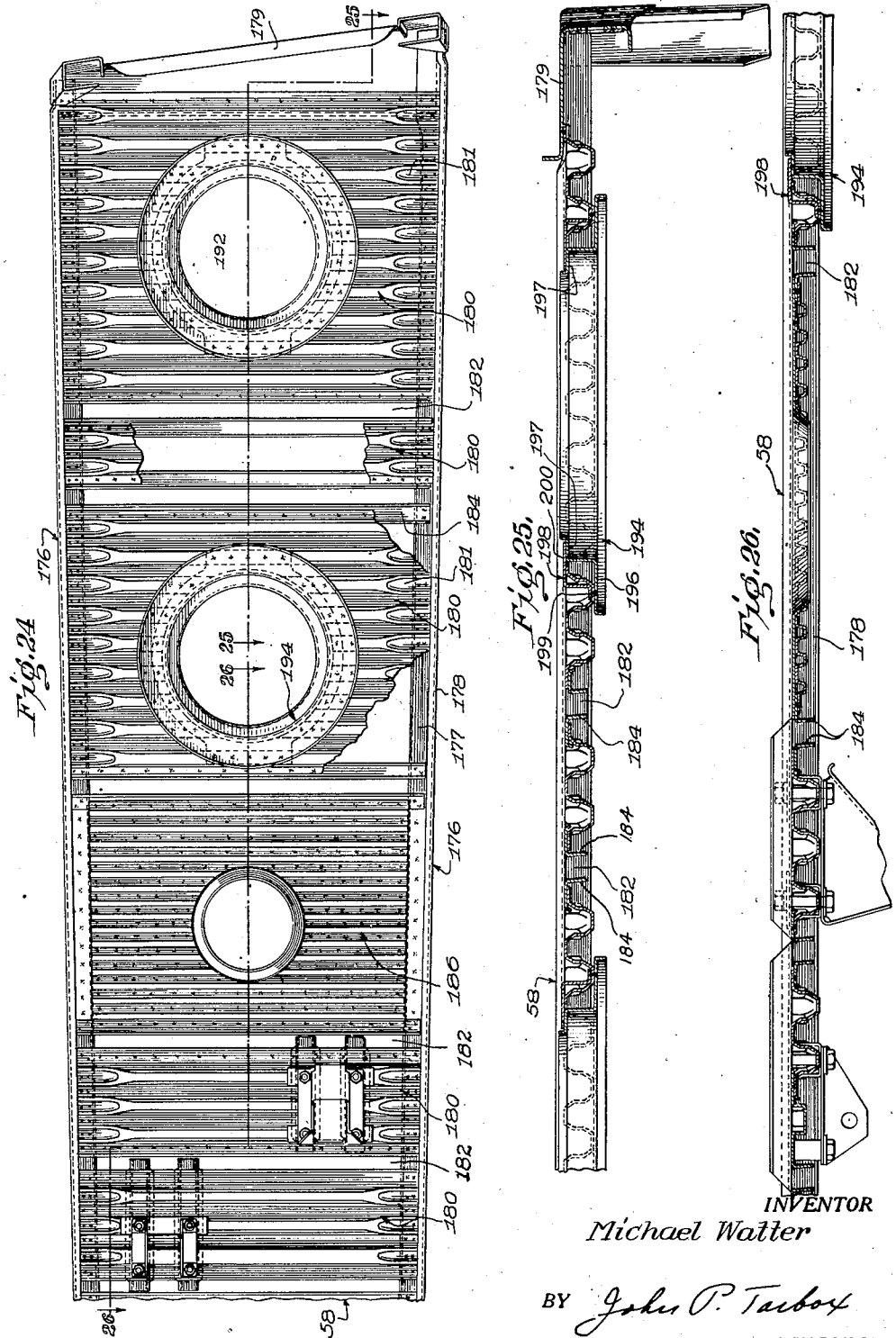

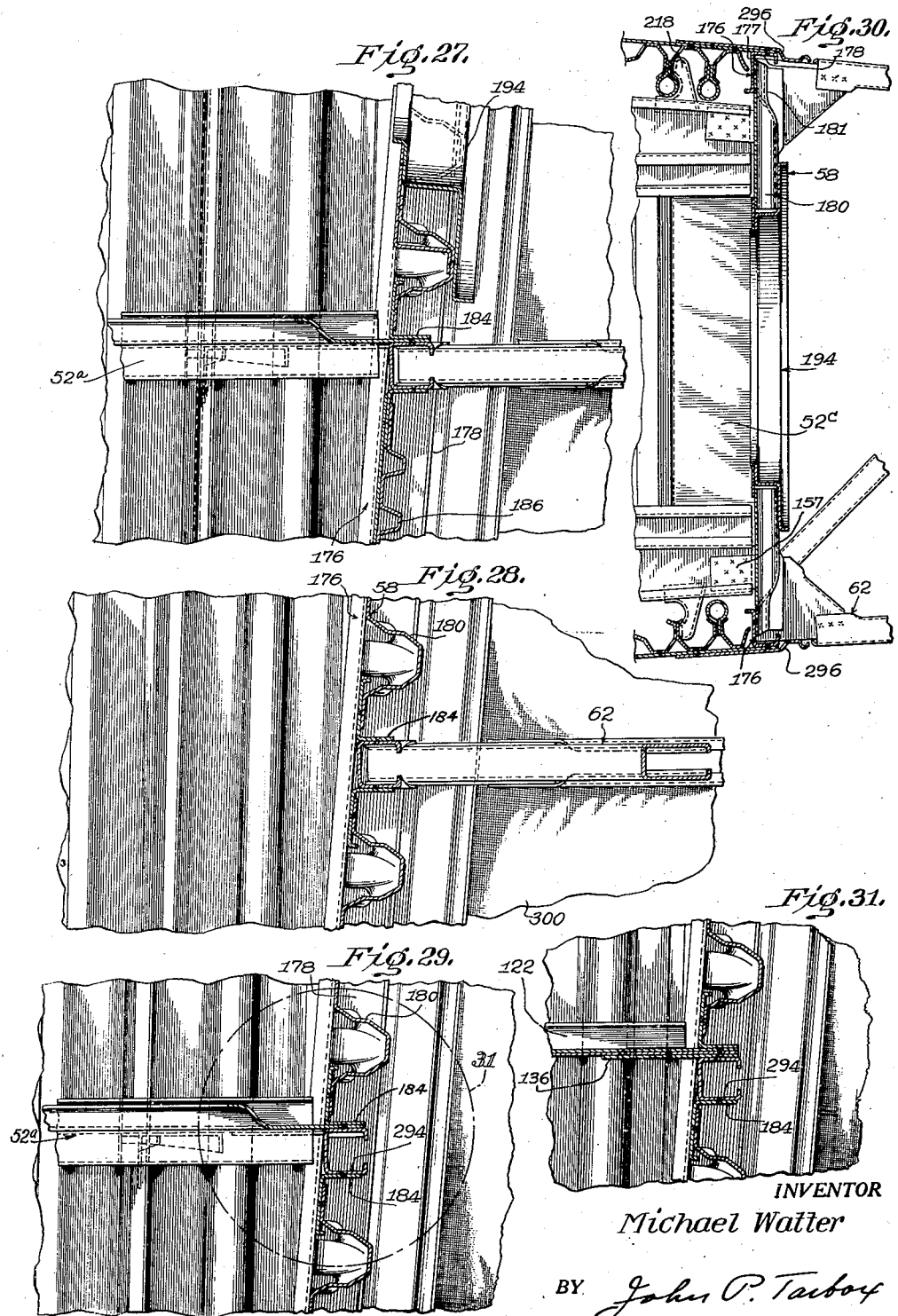

March 12, 1946. M. WATTER 2,396,625
AIRCRAFT STRUCTURE
Filed March 26, 1941 12 Sheets-Sheet 9
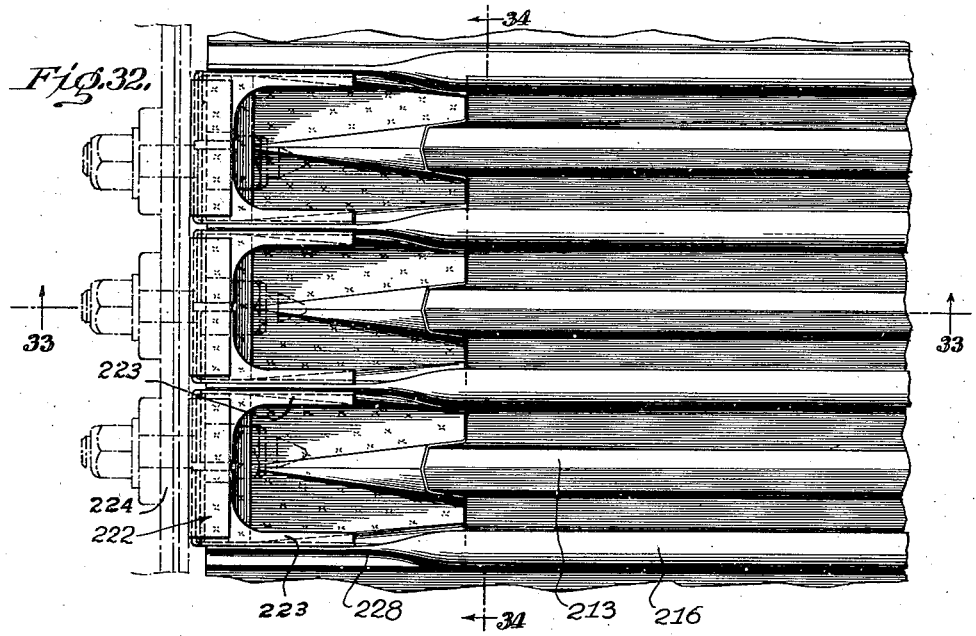
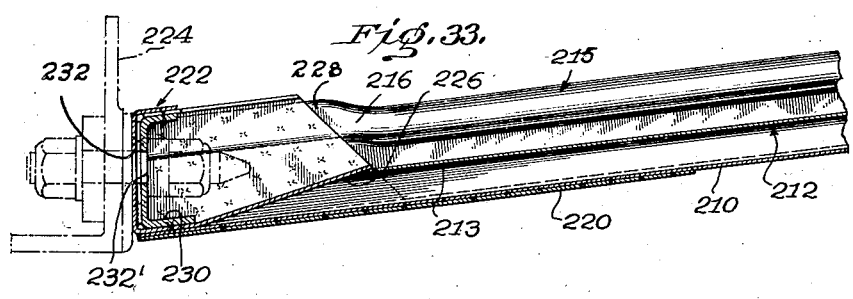
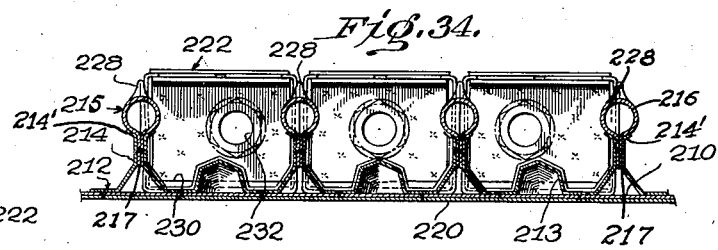
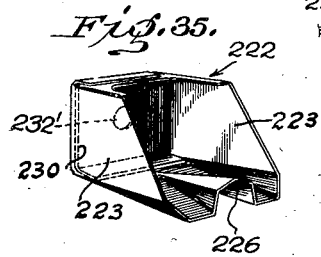
INVENTOR
Michael Watter
BY *John P. Tarbox*
ATTORNEY

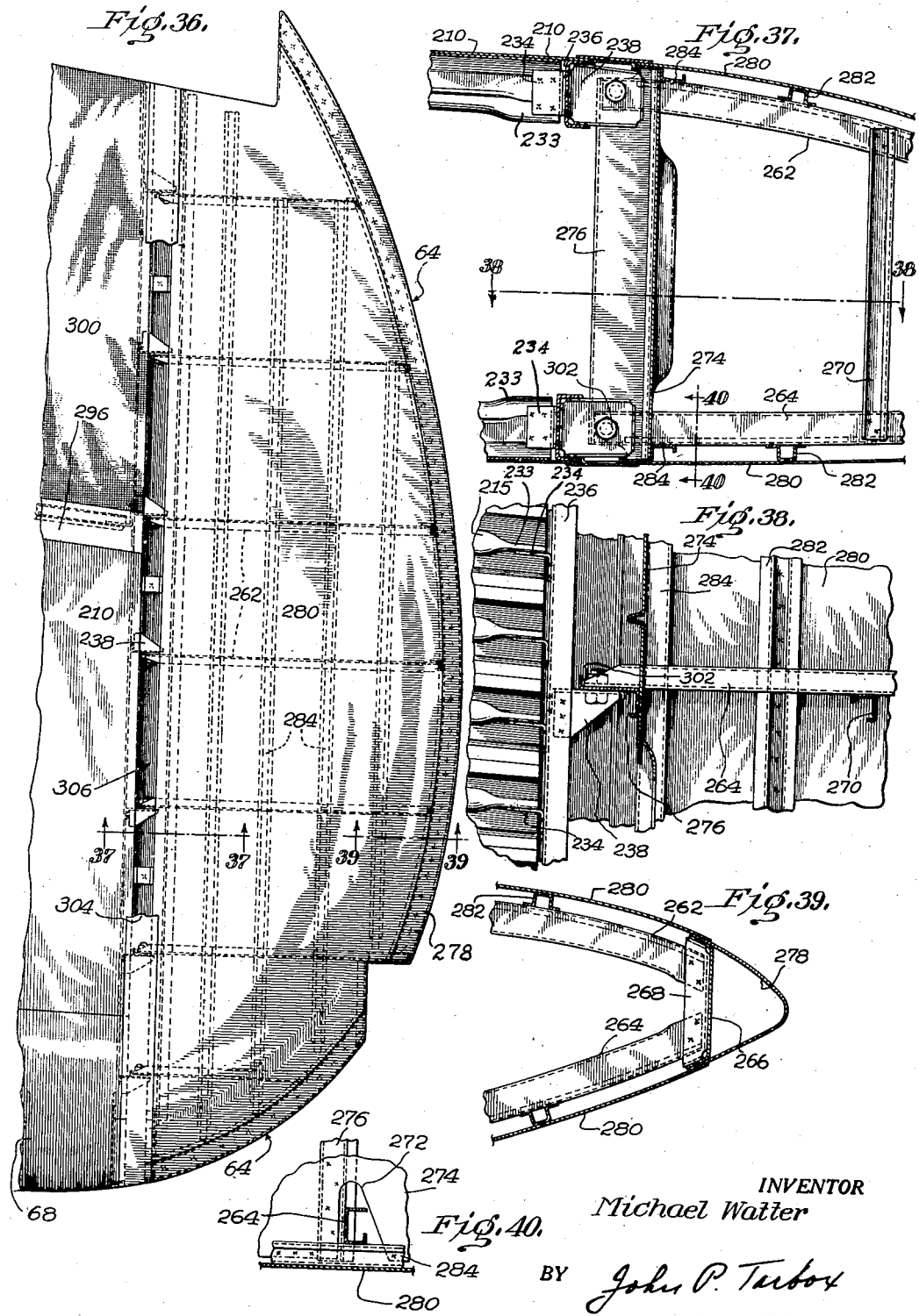

March 12, 1946.  M. WATTER  2,396,625
AIRCRAFT STRUCTURE
Filed March 26, 1941  12 Sheets-Sheet 11
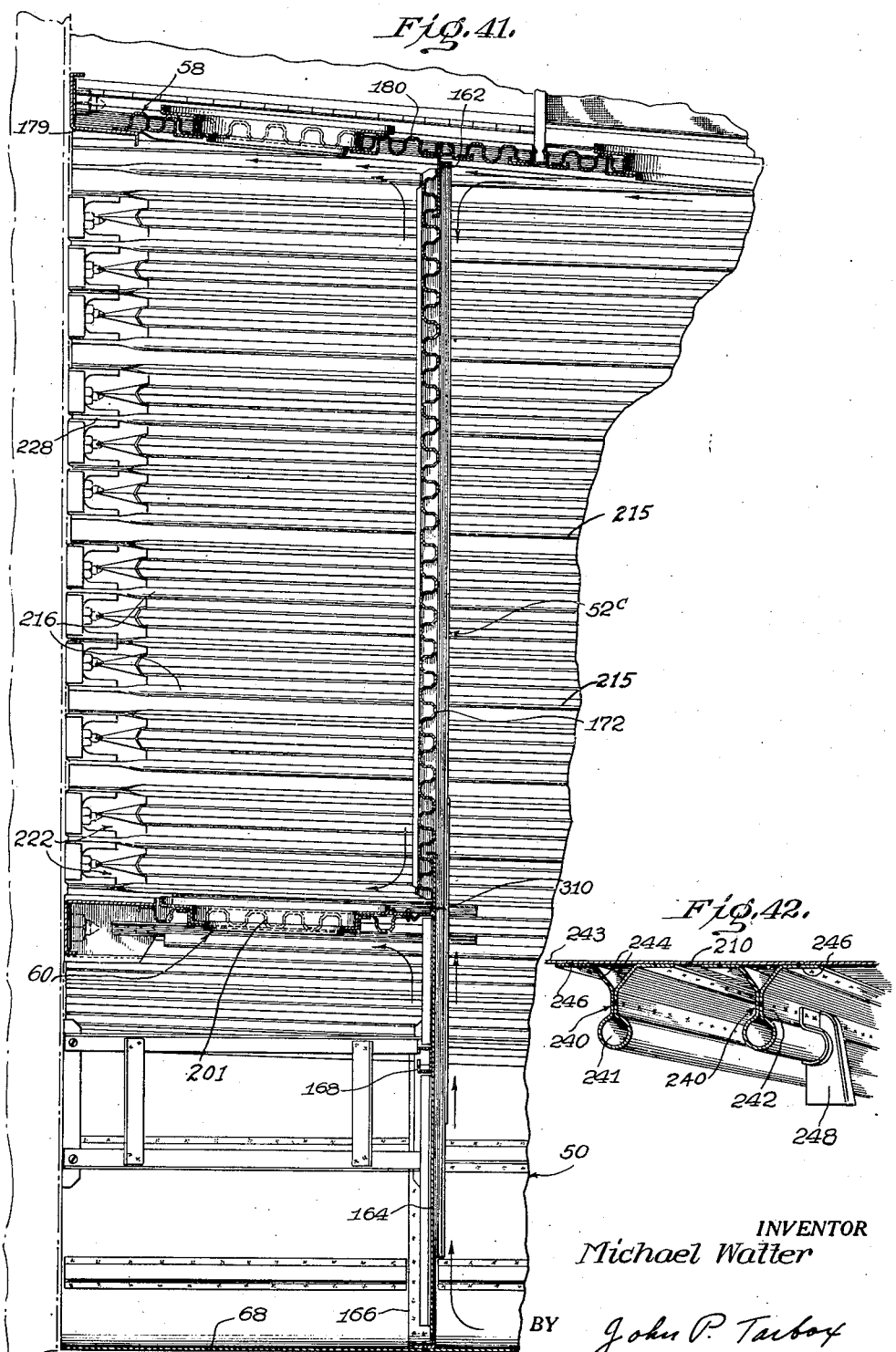
INVENTOR
Michael Watter
BY John P. Tarbox
ATTORNEY March 12, 1946.　　　M. WATTER　　　2,396,625
AIRCRAFT STRUCTURE
Filed March 26, 1941　　12 Sheets-Sheet 12
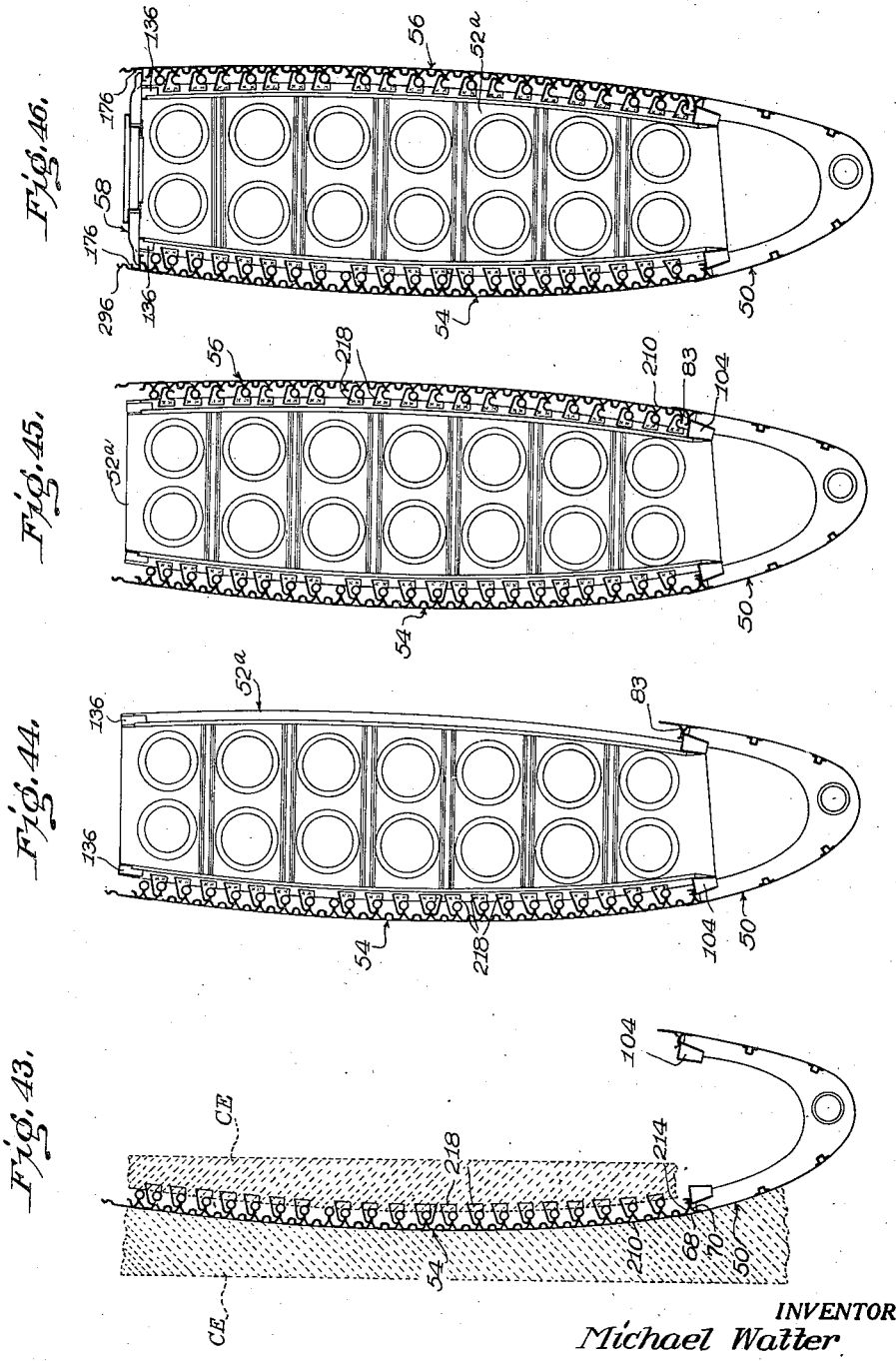
INVENTOR
Michael Watter
BY John P. Tarbox
ATTORNEY Patented Mar. 12, 1946

2,396,625

UNITED STATES PATENT OFFICE 2,396,625

AIRCRAFT STRUCTURE

Michael Watter, Philadelphia, Pa., assignor to Edward G. Budd Manufacturing Company, Philadelphia, Pa., a corporation of Pennsylvania Application March 26, 1941, Serial No. 385,235

13 Claims. (Cl. 244—123)

This invention relates to improvements in aircraft structure, more particularly to aircraft wings of the smooth surface type.

In aircraft wing structures, it is the practice to transmit the lifting and other forces to the fuselage or body by structural systems embodying one or more spanwise-extending spars or shear members connected with series of chordwise-extending ribs which, by their shape, determine the contour of the airfoil.

The present invention, while mainly directed to improvements in the airfoil structures as a whole, is directed particularly to the forward or principal load carrying part of the wing structure and to the utilization of metal by means of which a substantially completely welded structure is provided, the various elements of which, including a stressed skin covering, are so coordinated as to function as a unitary structure, generally known as a stressed skin type of structure. The inventon is further directed to improvements in the shapes and particular association of the structural members, whereby not only the various welding operations and assembly of the parts are greatly facilitated, but, also, great advantages in lightness in weight, in appearance and in durability without sacrifice in strength and rigidity are attained.

One of the objects of the present invention is to provide a structure which permits the use of a new and improved method wherein the various parts and subassemblies of large aircraft wings may be constructed accurately, easliy and economically and can be readily and securely assembled to provide a rigid wing structure capable of withstanding the loads and severe stresses to which it is subjected during flight.

Another object is to provide an aircraft wing fabricated from sheet metal and comprised of parts and subassemblies in which the structural elements are so shaped as to provide for a substantially completely welded structure in which convenient access may be had thereto for the performance of the welding operations necessary to unite the same.

Another object is to provide an improved arrangement for attaching a stressed skin blanket to an aircraft framing structure, which is of such character that greater ease and flexibility is provided during the attaching operations and also which attaching arrangement is capable of easy fixation to the spar and rib structure.

Another object is to provide an aircraft wing having improved rib, spar and skin blanket structure associated together in such manner as to provide maximum strength and rigidity while possessing minimum weight.

Another object is to provide new and improved means for connecting the various ribs and spar structures.

A further object is to provide an improved leading-edge assembly for aircraft wings which is lighter in weight than structures heretofore employed, and yet which is at least equally as resistant to torsional and other stresses and in which dishpanning due to buckling is minimized. A still further object is to provide a stressed skin type aircraft wing in which the transfer of the shear stresses is so mutually adjusted adjacent the root portion as to concentrate the loads at the desired points of attachment.

With the above and other objects in view, it will be obvious to those skilled in the art to which the invention appertains, the present invention consists in certain features of construction and combinations of parts, together with various steps in the assembly of the various parts, to be hereinafter described with reference to the accompanying drawings, and then claimed.

Referring to the accompanying drawings which illustrate a suitable embodiment of the invention, Fig. 1 is a plan view of an aircraft wing of the present invention;

Fig. 2 is an exploded, diagrammatical view of certain of the parts and subassemblies comprising the wing structure;

Fig. 3 is an enlarged, transverse, sectional view taken approximately on the line 3—3 of Fig. 1;

Fig. 4 is an enlarged, sectional view of that portion represented by the line 4—4 of Fig. 3;

Fig. 5 is an enlarged, sectional view of that portion of the structure represented by the line 5—5 of Fig. 3;

Fig. 6 is an enlarged, sectional view taken approximately on line 6—6 of Fig. 1, showing one of the nose-reinforcing ribs;

Fig. 7 is a sectional view taken approximately on line 7—7 of Fig. 4, showing the nose-reinforcing ribs in detail;

Fig. 8 is an enlarged, longitudinal, sectional view through one of the chordwise-extending ribs, taken approximately on the line 8—8 of Fig. 3;

Fig. 9 is an enlarged, perspective view of one of the clips utilized in securing the skin blanket to the ribs;

Fig. 10 is an enlarged, transverse, sectional view taken approximately on the line 10—10 of Fig. 1, showing a rib of reinforced construction;

Figs. 11, 12, 13, 14, 15 and 16 are enlarged sectional views taken approximately on the lines 11—11, 12—12, 13—13, 14—14, 15—15 and 16—16, respectively, of Fig. 10, showing various portions of the rib structure and mounting means in detail;

Fig. 17 is an enlarged transverse sectional view taken approximately on the line 17—17 of Fig. 1, showing the inboard rib in side elevation;

Figs. 18, 19, 20, 21, 22 and 23 are enlarged, sectional views taken approximately on the lines 18—18, 19—19, 20—20, 21—21, 22—22 and 23—23 of Fig. 17, showing various parts of the rib structure of Fig. 17 in greater detail;

Fig. 24 is an enlarged, fragmentary, side elevation of the spanwise-extending spar or shear web;

Fig. 25 is an enlarged, sectional view taken approximately on the line 25—25 of Fig. 24;

Fig. 26 is an enlarged, transverse, sectional view taken approximately on the line 26—26 of Fig. 24;

Fig. 27 is an enlarged, sectional view taken horizontally at the region indicated by the dot-and-dash circle 27 in Fig. 1, and showing the connection between one of the main ribs, one of the trailing ribs and the shear web;

Fig. 28 is an enlarged, sectional view taken horizontally at the region indicated by the dot-and-dash circle 28 in Fig. 1, showing the connection between one of the trailing ribs and the shear web;

Fig. 29 is an enlarged, sectional view taken horizontally at the region indicated by the dot-and-dash circle 29 in Fig. 1, showing the connection between one of the ribs of the forward section and the shear web;

Fig. 30 is an enlarged, sectional view taken approximately on the line 30—30 of Fig. 1;

Fig. 31 is a sectional view taken horizontally at the region indicated by the dot-and-dash circle 31 in Fig. 29 at a lower position in the structure, showing the connection between one of the forward ribs and the shear web;

Fig. 32 is an enlarged, sectional view at the inboard end of the structure looking toward the corrugations of the bottom skin blanket and showing the bracket means for attaching the structure to a portion of the fuselage or body of an aircraft;

Fig. 33 is a section taken approximately on the line 33—33 of Fig. 32;

Fig. 34 is a transverse section taken approximately on the line 34—34 of Fig. 32;

Fig. 35 is a perspective view of one of the corrugation-receiving brackets shown in Figs. 32, 33 and 34;

Fig. 36 is an enlarged, top plan view of the tip portion of the wing shown in Fig. 1;

Fig. 37 is an enlarged, longitudinal, sectional view taken approximately on the line 37—37 of Fig. 36;

Fig. 38 is a horizontal, sectional view taken approximately on the line 38—38 of Fig. 37;

Fig. 39 is an enlarged, longitudinal, sectional view taken approximately on the line 39—39 of Fig. 36;

Fig. 40 is a transverse, sectional view taken approximately on the line 40—40 of Fig. 37;

Fig. 41 is a section taken horizontally at the inboard end of the wing structure through the main and stub spars and the inboard rib;

Fig. 42 is a section through a skin blanket of modified construction showing the reinforcement and stringers of one-piece construction; and Figs. 43 to 46, inclusive, are schematic views showing various stages in the assembly of the wing elements.

Referring to the accompanying drawings, in which like numerals refer to like parts throughout the several views and particularly to Figs. 1 and 2, the wing structure comprises in general a leading edge or nose assembly 50, transverse ribs 52a, 52b, and 52c, a spanwise-extending spar or shear web 58, a stub shear web 60, top and bottom skin blankets 54 and 56, respectively, trailing ribs 62, and a wing tip assembly 64.

For the purpose of convenience these parts and sub-assemblies will be described in the order given.

Referring to Figs. 2, 4, 6, 7 and 10 in particular, the leading edge assembly 50 includes a thin skin 68 of high-tensile strength stainless steel or other suitable material, having at its upper longitudinally extending edge an attaching element 70 provided with a forwardly extending skin-attaching flange 72 and a laterally extending flange 74, to which portions of the skin blanket are later secured. The laterally extending attaching flange 74 preferably terminates in a rearwardly extending stiffening flange 76. The bottom edge of the skin is also provided with a longitudinally extending attaching element 78. The element 78, like the element 70, is provided with a forwardly extending skin-attaching flange 80 and a laterally extending flange 82. The flanges 72 and 80 of the attaching elements 70 and 78 are suitably spot welded to the skin in such manner that the skin projects, as shown in Fig. 4, rearwardly beyond the lateral flanges 74 and 82.

As shown in Figs. 6 and 7, an additional longitudinally extending reinforcing element 83 is provided for the lower edge of the skin 68, which element has flanges securely welded to the lateral flange 82 of the element 78 and to the lower end of the skin 68.

As more clearly shown in Figs. 6 and 7, the leading edge assembly is also provided with rib-like nose-forming and reinforcing elements 84, which are shaped to the contour of the leading edge of the airfoil. Each of these elements 84 comprises a pair of L-shaped angle members 86 and 88 welded together face to face with the lateral flanges thereof extending in opposite directions. As shown in Fig. 7, the lateral flange of the angle member 86 is welded at spaced intervals to the skin 68. The reinforcing elements 84 are provided at their upper and lower rear ends with L-shaped brackets 90, having one leg securely welded thereto and the other leg 92 welded to the flanges 74 and 82 of the longitudinally extended attaching elements 70 and 78.

The leading edge assembly, see Figs. 1, 4 and 7, is further provided with additional nose-forming and reinforcing elements 94, which are arranged to be not only attached to the longitudinally extending attaching elements 70 and 78, but also to specific ribs hereinafter designated by numeral 52a. The reinforcing elements 94 comprise inner and outer L-shaped elements 96 which are interconnected by a web 98 securely welded thereto. The laterally extending flange of the outer element 96 is securely welded to the skin 68 at spaced intervals, and as shown in Figs. 4 and 7, the web is provided with an opening 100 which in addition to providing for a lightened structure also provides an aperture through which control wires or rods (not shown) may be disposed. It is preferable to dish the web 98 around the opening 100 to reinforce the same, as shown at 102 in Fig. 4. Suitably secured to the ends of the nose-reinforcing elements 94 are attaching plates 104, having flanges 106 extending parallel to the longitudinally extending elements 70 and 78 and which are suitably welded thereto.

The leading edge assembly, see Figs. 1 and 10, is further provided with additional nose-forming and reinforcing elements 108 which are also arranged to be subsequently attached to certain reinforced ribs, hereinafter designated as ribs 52b. The reinforcing elements 108 each comprise a generally L-shaped angle member 110 having a sheet metal web 114 securely welded thereto, the laterally extending flange of the L-shaped member 110 being welded at spaced intervals to the skin 68. The ends of the L-shaped members 110 are interconnected by a depthwise or vertically extending channel member 112, see Figs. 10 and 16, which is securely welded thereto, to the web 114 and to the longitudinally extending elements 70 and 78. The reinforcing element 108 is also provided with a plurality of vertically extending angle members 116 securely welded to the member 110 and the web 114.

In order to stiffen the portions of the skin disposed between the various nose-forming and reinforcing elements described, a plurality of spanwise or longitudinally extending intercostal stiffeners or elements 118 are provided, as shown in Fig. 7. These stiffeners 118 are preferably arranged in parallel relationship and may be hat-shaped in cross-section, and provided with marginal flanges 120 spot welded at suitably spaced intervals to the inner surface of the skin 68.

This comprises the substantially complete leading edge assembly which, by reason of the particular cross-sections of the various elements shown and described, may be made up as a unitary subassembly. It is to be noted that the cross-sectional shapes of the various elements are of the open stringer type so that complete access may be had thereto for the performance of the various spot welding operations.

While no particular order of procedure in the assembly of the various parts of the leading edge assembly 50 has been described, it is obvious that the assembly can be accomplished most expeditiously by, for example, constructing the complete nose-forming and reinforcing elements 84, 94 and 108 as independent bench assemblies, and by securing the attaching members 70 and 78, the lower longitudinal reinforcing member 83 and the stiffeners 118 to the skin 68 to provide a separate subassembly, during which such parts can be welded easily and quickly because of the lack of interfering parts. Subsequently the nose-forming and reinforcing elements 84, 94 and 108 may be disposed in a suitable jig in order to provide the desired spacing and, then, the skin subassembly just described can be applied and suitably welded to the skin attaching flanges of the nose-forming and reinforcing elements 84, 94 and 108, and the flanges 92 and 106 and the channel 112 welded to the longitudinally extending attaching elements 70 and 78. In this connection it can be readily seen from the drawings that freedom of access can be had to these various parts for performing the welding operation.

Due to the shear, bending and torsion stresses to which the nose is subjected there is a tendency for the skin to buckle or wrinkle diagonally. This occurs particularly rearwardly of where the curvature begins to flatten out and when subjected to continued or repeated stresses such buckles or wrinkles tend to lengthen and in time to "dishpan" or become permanent and increase the resistance of the wing surface to the air flow.

One of the important advantages flowing from the leading edge assembly described is that the tendency toward buckling is not only minimized but also delayed. This is accomplished by the discontinuous intercostal stiffeners 118, the ends of which, as will be seen in Fig. 7, are spaced slightly from the various nose-forming and reinforcing elements, and the first of which are secured to the skin substantially at the region where the curvature of the rounded nose of the skin begins to flatten into the upper and lower portions of lesser curvature, as shown in Fig. 6.

The second series of stiffeners 118 are positioned intermediate the series just mentioned and the rear edge of the skin, so that, in effect, the rearwardly extending flatter skin surface is broken up in such manner that the buckling will be broken up correspondingly, thus not only minimizing, but also delaying buckling of the skin. In effect, the skin itself provides substantially flat plate trusses or sections of small magnitude of curvature extending from approximately the change in curvature to the rear end of the leading edge assembly.

The number of series of intercostal stiffeners, of course, may be decreased or increased, as desired, depending upon the chordwise depth of the leading edge section.

The number of ribs employed, of course, may vary according to the span of the wing and the load distribution. As here employed (Fig. 1), the ribs are designated specific ribs 52a, reinforced ribs 52b and an inboard or shear transfer rib 25c.

Referring to Figs. 2, 4, 5, 7 and 8, the specific ribs 52a comprise upper and lower chord members 122 and an interconnecting web 128 suitably spot welded to the webs 124 of the chord members 122, the chords each being of generally S-shaped cross-section to provide the vertical web 124 with marginal longitudinally extending flanges 126 which terminate in vertical flanges 127, whereby the chord members 122 are rendered torsion resistant and are of great strength.

In order to resist buckling, the sheet metal webs 128 are provided at spaced intervals with vertically extending series of corrugations 134, as clearly shown in Figs. 4, 7 and 8, and in order to lighten the weight of the ribs, the webs 128 may be provided with openings 130 intermediate the series of corrugations 134, which openings are preferably dished, as shown at 132 in Fig. 8, to provide additional reinforcement. It is to be understood, however, that the openings 130 may be omitted where additional strength is required.

Attaching and reinforcing plates 136 are welded to the trailing ends of the chord members 122, as shown in Fig. 5, for attachment, as will be later described, to the shear web 58, a portion of the marginal flanges 126 of the chord members 122 being removed, as shown at 137 in Fig. 5 to permit insertion of the shear web.

Here again, it is to be noted that the chord members 122, while being of such shape as to provide a rigid, well reinforced rib, are such that the spot welding operations required for securing various parts together can be easily performed without interference from projecting parts.

In many instances additional loads are imposed on an aircraft wing such as, for example, when floats are employed as in naval aircraft, in which case it is desirable, due to the additional stresses imposed, to provide ribs of reinforced construction. The ribs 52b, more clearly shown in Figs. 10 to 16, inclusive, have been particularly designed to compensate for such additional stresses as are occasioned by the use of floats or other devices.

As in the case of the ribs 52a, the structural elements employed in the construction of the ribs 52b are of open stringer construction to give complete freedom of access for the welding operation and, in addition, are of such cross-sectional shape as to impart maximum strength without excess weight. This rib includes top and bottom chord members 138 and 140, respectively, which are of open channel construction, each having marginal stiffening flanges 139 and 141, respectively, disposed parallel to the channel bases. The rib further includes top and bottom cap strips 142 and 144, respectively, and a web 146 of sheet metal extending between the chord members 138 and 140. As here shown the cap strips 142 and 144 are disposed between the web 146 and the bases of the chord members 138 and 140, these parts being securely welded together.

The chord members 138 and 140, at their leading ends, project well beyond the ends of the cap strips 142 and 144 for attachment, as will be later described, to the nose-reinforcing elements 108, and at their trailing ends terminate short of the web 146, as shown in Fig. 10. The chord members are provided with splice channels 148 nesting within the same and which are securely welded thereto, the splice channels 148 terminating with the web 146.

Due to the additional loads imposed upon the ribs 52b by the floats or other devices through the attaching brackets 149 at the leading end of the ribs, the lower chord members may be reinforced to compensate for the additional bending stresses by channel-shaped members 150 nesting within the same and securely welded thereto.

In order to reinforce the webs 146 against buckling occasioned by the compressive stresses imposed thereon, a plurality of spaced vertically-extending stiffening elements 152, preferably of channel-shaped construction, are securely welded to the web 146 and through the web to the cap strips 142 and 144 and the chords 138 and 140. If desired, each of the stiffening elements 152 may be formed with a vertical corrugation 153 (Fig. 14) intermediate the flanges thereof to provide additional stiffness, the corrugation 153 being shown in Fig. 14.

The ribs 52b, if desired, instead of being constructed as just described, may be constructed similar to the ribs 52a but with a web of thicker gauge sheet metal, either with or without the openings therein, depending upon the strength required.

The inboard rib 52c which transmits a larger portion of the stresses to the shear web 58 is best shown in Figs. 17 to 23, inclusive. In the particular wing construction in which the present invention is embodied, the nose portion on the lower side intermediate the inboard rib 52c and the stub wing S of the aircraft body (indicated in broken outline in Fig. 1) is interrupted by an opening O (indicated in broken outline in Fig. 1) which in the present case is for a battery box (not shown). In this case the inboard rib 52c functions to transfer additional shear stresses from the leading edge assembly to the aircraft body and accordingly is made heavier than the specific ribs 52a. This rib, like the ribs 52b, includes upper and lower chord members 154 and 156, respectively, channel-shaped in cross-section, and upper and lower cap strips 158 and 160, respectively, the chord members 154 and 156 being securely welded to the cap strips 158 and 160, respectively. The vertical plate parts of the cap strips comprise part of the web of the rib. The cap strips are provided with attaching plates 157 securely welded to and projecting rearwardly therefrom, as shown in Fig. 17, for subsequent attachment to the shear web 58. The chord members are interconnected at their trailing ends by a vertically extending plate 162 securely welded thereto through the metal of the cap strips, and at their leading ends by a sheet metal plate 164 securely welded thereto, which plate is also welded to the cap strips 158 and 160 which terminate rearwardly of the leading ends of the chord members. The plate 164 is also securely welded at its leading edge to an L-shaped member 166 to which the leading ends of the chord members 154 and 156 are also welded and which is shaped to the contour of the skin of the leading edge assembly 50 for subsequent assembly to the leading edge assembly. The rearward ends of the L-shaped member 166 are interconnected by means of a vertically extending channel-shaped stiffening member 168, as shown in Figs. 17 and 23, which stiffening member is welded to the plate 164, the chord members 154 and 156 and to the cap strips 158 and 160. This channel-shaped stiffening member 168 reinforces the leading end of the rib 52c against buckling. The plate 164 is additionally reinforced against buckling by a sheet 169 of metal having a series of horizontally extending corrugations 170, the bases of alternate corrugations being welded to the plate 164. These corrugations extend forwardly from the stiffening element 168 to the nose-contoured angle-shaped member 166 and rearwardly from the stiffening element 168 to a region short of the trailing end of the plate 164.

In order to provide for great resistance to the compressive forces produced at the inboard end of the wing, the inboard rib 52c is provided with a corrugated web member 172 for the space defined by the chord members 154 and 156, the vertical plate 162 and the vertical plate 164. The bases of the alternate corrugations of member 172 are securely welded to the cap strips 158 and 160 and also to the plates 162 and 164, which they overlap at their ends. In order to securely hold the ends of the unsecured bases of the corrugated member 172 against the tendency to roll when subjected to torsion stresses, supplemental chord spaced members 173 are provided to extend longitudinally of the cap strips 158 and 160 and are rigidly secured thereto by spot welding. These members 173 are provided with flanges 174 facing each other and overlapping the unsecured alternate bases in such manner that they can be spot welded thereto, as shown in Figs. 20 and 21. It is thus seen that the base of each corrugation of the member 172 is secured at its end to prevent rolling or flattening when subjected to torsion stresses. If desired, the chord members 154 and 156 may be additionally reinforced for any part of their length (Fig. 17) by channel members 175 nesting within the same and welded thereto.

The rib 52c, as in the case of the ribs previously described, can be built up as a subassembly in which each of the structural elements thereof are of such shape and cross-section that ready access is had thereto for the performance of the welding operation.

The spar or shear web 58, which transfers the major portion of the stresses to the fuselage or body of the aircraft, is shown in Figs. 24 to 31 inclusive. It is comprised of spaced upper and lower chord members 176 extending spanwise from the inboard end of the wing to the wing tip. Each of these members is generally L-shaped in cross-section to provide a vertical flange 177 and a lateral flange 178.

The members 176 are rigidly interconnected at their inboard ends by means of an attaching bracket 179, which may be of any desired construction. As shown in Fig. 24, a web structure interconnecting the chord member 176 is shown as comprising a series of corrugated webs 180. Each web 180 terminates in spaced relation with respect to the next adjacent web to provide a vertical space 182 which, as will be later described, is for the purpose of receiving the ends of the various ribs. Accordingly, the spacing is varied in accordance with the spacing of the ribs and the number of ribs, it being understood that the number of ribs is dependent upon the load distribution in any particular wing structure. Each corrugated web 180 is suitably spot welded at alternate bases to the vertical flanges 177 of the spanwise-extending members 176. Moreover, in order to prevent rolling or flattening of the corrugations when subjected to torsion stresses and in order to provide for greater vertical rigidity, the ends of each of the unsecured bases are depressed inwardly as shown at 181 in Fig. 24 and also securely spot welded to the flanges 177 so that, as a result, the ends of each base of the corrugated web are rigidly secured to the flanges 177. The free edge of each corrugated web 180 is further reinforced by means of angle members 184 each securely welded along one of its flanges to the edge of the web 180 and to the vertical flanges 177 of the members 176 so that each of the spaces 182 is defined by parallel flanges of the angle members 184, as shown in Figs. 25 and 26. Although the structure of the shear web 58 is not shown in complete detail from end to end, it is to be understood that a series of webs 180 are provided from end to end and that such webs may be provided with shallower corrugations or corrugations of lesser pitch progressively outwardly from the inboard end, if desired, depending upon the load distribution of the particular wing. Also, if desired, dependent upon the load distribution, certain of the corrugated webs 180 may be replaced by webs 186, such as shown in Fig. 24, having what may be termed fine corrugations.

In order to lighten the web structure and to provide for hand openings or openings for control rods or wires, etc., openings 192 may be provided in the webs as shown in Fig. 24. Due to the removal of the metal to form the opening 192 it is desirable to compensate for the loss of strength of the particular web 180. One satisfactory means for doing this comprises an annular sheet metal member 194 having an outer flange 196 disposed to seat upon the alternate bases of the corrugations and an inner flange 197 disposed substantially in the plane of the other alternate bases of the corrugations, as shown in Fig. 25. The reinforcing ring also includes a second annular ring 198 having portions 199 seating against the opposite surfaces of the corrugation bases against which the flange 196 seats so that the flanges 196 and 199 are securely welded together through the corrugation bases with which they contact. The ring 198 also is provided with an annular inner flange 200 which seats upon other bases of the corrugations and against the flange 197 of the member 194 and which is securely welded to these bases and this particular flange, thereby providing an opening which is rigidly reinforced around its periphery.

The stub shear web or spar 60 indicated in Fig. 1 which extends in an inboard direction from the inboard rib 52c which is secured to the spar 58 is not shown in detail, except as sectionally shown in Fig. 41. However, it is to be understood that this stub spar may be of the same general construction as the shear web or spar 58, that is, embodying a vertically corrugated web similar to the web 201, 180, or if desired, of any other suitable construction.

The spar or shear web 58, as in the case of the various elements previously described, can be assembled as a unitary structure or subassembly separate from the wing structure and, by reason of the open stringer construction, each of the various elements comprising the same are so arranged that ready access is had for the performance of all of the welding operations.

The top and bottom skin blankets 54 and 56 are of the same general construction. They are best shown in Figs. 2, 4, 5, 8, 32 and 34 and are of the stressed skin type, embodying, in general, the teachings of my copending application, Serial No. 285,360, filed July 19, 1939, and in addition include improved means for mounting the blankets upon the wing framing.

Each blanket comprises a skin sheet 210 of thin gauge metal welded to a stiffening structure. The stiffening structure comprises a plurality of spanwise-extending channel-shaped members 212, each having a longitudinally extending corrugation 213 intermediate the lateral flanges 214. Whereas in the construction described in my said copending application, the flanges which correspond to the lateral flanges 214 are secured together in overlapping relation, according to the present construction, tubular stringers 215, formed from single sheets of relatively thin gauge metal to provide the tubular portion 216 thereof and overlapping radially-extending flanges 217, are provided between the channel members 212 and the ribs 52a, 52b and 52c. Referring to Fig. 34, it will be seen that the radially-extending flanges 217 of the stringers 215 are disposed between and welded to the lateral flanges 214 of the channel members 212, the flanges 214 being marginally flanged to provide portions 214' seating against the tubular portions 216 of the stringers 215. Also welded to the flanges 214, as shown in Figs. 2 and 4, are spaced rib attaching clips 218 which are peripherally flanged at 219 (Fig. 9) to strengthen the same, thereby to resist compressive stresses and also to provide arcuate seats for the tubular portions 216 of the stringers 215. If desired, the tubular stringers 215 may be omitted occasionally on the lower skin blanket 56, as indicated in Figs. 2 and 5, in which case the flanges 214 are welded directly together as indicated.

It is possible by the use of the tubular stringers to provide greater depth between the skin and the ribs without sacrifice in strength or weight. Being tubular in cross-section, the stringers 215 may be of a gauge thinner than is necessary in the case of flat members, with a resulting saving in weight and an increase in torsional rigidity. Moreover, the tubular stringers present smooth surfaces in contrast to sharp edges, which is a material factor as regards the safety of the workman during the operation of attaching the skin blankets to the wing framing.

Each of the skin blankets (Figs. 33, 34) is provided at the inboard end with a reinforcing strip of metal 220 securely welded thereto and extending in a chordwise direction. Also provided at the inboard end of the blankets are series of attaching brackets 222 having side walls 223, shown more clearly in Figs. 32 to 35, inclusive, for securely attaching the inboard end of the blankets to a suitable portion 224 of the stub wing S (indicated in broken outline in Figs. 32 and 33) and the fuselage of an aircraft. The brackets 222 are cup-shaped and provided with a triangular-shaped pocket 226 in one wall thereof to receive the end of the corrugation 213 which has previously been cut at an angle corresponding to the triangular pocket 226. The inboard end of each of the tubular stringers 215 is flattened as indicated at 228 in Figs. 32 and 34. Also, nesting within each of the brackets 222 is a relatively heavy U-shaped reinforcing member 230 securely welded to the bottom and the four walls constituting the pocket of the bracket 222, the bottom of the pocket and the U-shaped member 230 being provided respectively with apertures 232, 232' arranged coaxially for the reception of a securing bolt. As will be seen in Figs. 32, 33 and 34, one such bracket 222 is provided between each adjacent pair of spanwise-extending stringers 215, the flattened ends 228 of the stringers 215 being securely held between the side walls 223 of adjacent brackets 222 and welded thereto, the brackets also being securely welded to the skin 210 and the reinforcing strip 220.

The opposite or tip ends of the stringers 215 terminate short of the skin 210, as shown in Figs. 37 and 38, and are flattened as indicated at 233 and provided with bent attaching clips 234 welded thereto, which are also welded to a chordwise-extending member 236 of channel-shape cross-section, one of the flanges of which is securely welded to the skin 210. The channel member 236 of each skin blanket also carries a plurality of bracket members 238 to which the wing tip structure 64 may be secured, as will be later described.

A modified skin reinforcing means is shown in Fig. 42 as comprising spaced laterally extending members 240. These members are each formed from a single sheet of metal to provide a tubular stringer 241, the ends of the sheet flanging from the portion 241 in overlapping relation to provide parallel flanges 242 which, adjacent the skin sheet 243, diverge, as shown at 244, toward the skin sheet and terminate in flange portions 246 which are securely welded to the skin sheet. Attaching clips 248 similar to the clips 218, previously described, are welded to the members 240 for attachment to the ribs 52a, 52b and 52c.

It can be seen that by forming the skin reinforcing structure in this manner that not only can considerable saving in weight be effected, but also that the time consumed by the various welding operations is materially reduced.

Each of the trailing ribs 62 may be of any suitable construction, but, as here shown in Figs. 2 and 3 for the purpose of illustration, comprise upper and lower chords 250 and 252, respectively, interconnected by suitable struts 254 securely welded thereto, the rearward ends of the chord members 250 and 252 are interconnected by a member 260 and the forward ends are connected by a vertical strut 256 by means of gusset plates 258, as shown in Fig. 2.

The wing tip assembly 64 comprises a plurality of spaced upper and lower frame members 262 and 264, respectively, as shown in Figs. 36 to 40 inclusive, which are connected at their outward ends by a vertically disposed platelike member 266. The member carries spaced weblike portions 268 which are welded to the ends of the members 262 and 264. The members 262 and 264 are interconnected intermediate their ends by vertically extending struts or compression members 270 of L-shaped cross-section. The inward ends of the members 262 extend through slots 272 provided in a chordwise-extending sheet of metal 274 which carries vertically extending generally Z-shaped struts or compression members 276 securely welded thereto, and which are also attached at their ends to the upper and lower members 262 and 264.

As shown in Fig. 39, the member 266 carries a continuously extending V-shaped sheet of metal 278 which forms the edge of the wing tip. The wing tip is provided with upper and lower skin blankets 280, each of which is provided with chordwise-extending stiffening elements 282 of hat-shape cross-section securely welded thereto. The marginal edges of the skin blankets are welded through the edge portion 278 to the members 266, and the flanges of the stiffening elements 282 are also welded to the upper and lower members 262 and 264. The inner ends of the skin blankets 280 are provided with chordwise-extending elements 284, fitting over the portions of the ends of the vertical members 276 and being securely welded to the upper and lower members 262 and 264.

The wing tip is of relatively simple yet relatively rigid construction and it can be seen that the structural shapes are such that easy access is had to the various parts for welding adjacent parts together.

The wing tip skin sheets are tensioned in order that they shall be free of wrinkles or bulges and are applied in such manner that they are tensioned longitudinally of the stiffeners 282. This may be accomplished in the manner taught in my copending application, Serial No. 382,331, filed March 8, 1941, wherein the skin is stretched or tensioned between the regions of securement to the respective stiffeners whereby to remove the wrinkles or bulges around the spot welds which are frequently occasioned by the cooling of the metal after the welding operation.

As previously set forth, the subassemblies and structural elements in addition to being so constructed and coordinated as to provide for minimum weight with great strength are also so contoured and constructed as to provide for assembly with great dispatch and a minimum number of operations.

Figs. 43 to 46, inclusive, and Fig. 3 show in schematic outline (for simplification of illustration) various stages of the assembly operation.

In the assembly of the wing structure, the leading edge assembly 50 first is supported in a suitable jig (not shown) which securely holds it in the position shown in Fig. 43. The top skin blanket 54 is then disposed in proper position in the jig and securely clamped against movement by means of clamping elements CE diagrammatically indicated in broken outline in Figure 43, which are so shaped to the final blanket contour as to hold the blanket in substantially the exact shape and contour it assumes in the completed wing. In the secured position of the blanket 54, the skin sheet 210 thereof overlaps the rearwardly extending edge of the nose skin 68, and the flange 214 of the foremost channel member 212 abuts the lateral flange 74 of the longitudinally extending attaching member 70. These engaging parts are then spot welded, it being observed that complete freedom of access may be had thereto with welding tongs for performing this operation. In the case of the overlapping skin sheets the welding tongs straddle the skin blanket.

The next step in the assembly operation is to position the ribs 52a and the ribs 52b in the jig, wherein they are securely held in position. This stage of the operation is shown in Fig. 44, a rib 52a being shown. In connection with the ribs 52a, the attaching plates 104 overlap the forward ends of the chords 122 in overlapping relation, and the skin blanket attaching clips 218 also overlap the upper chord 122 in overlapping relation. The overlapping parts 104 and 122 are spot welded together, the ribs 52a being straddled by the welding tongs in the performance of this operation.

The ribs 52b, although not shown in Fig. 44, likewise are held in position by the jig, in the position indicated in Fig. 10, with the chord members 138 and 140 overlapping the nose-forming and reinforcing elements 108, the chord members being securely welded in this position to the elements 108. Also, in this position of the ribs 52b the cap strips 142 thereof engage with the sides of the skin blanket attaching clips 218.

The rib 52c is then moved into position from the inboard end of the wing and securely clamped. The angle-shaped nose element 166 is secured to the nose skin 68 by spot welding and the channel-shaped element 168 is securely spot welded to the upper and lower attaching strips 70 and 78 of the nose assembly. Also, in this position of the rib 52c the upper cap member 158 thereof is in overlapping engagement with the skin blanket attaching clips 218.

The next step in the welding operation is that of securing the top skin blanket 54 to the ribs 52a, 52b and 52c. As previously described, these ribs when they are assembled in their proper positions overlap the skin blanket attaching clips 218. The spot welding of the clips 218 to the top chord members 122 of the ribs 52a and the top cap strips 142 and 158 of the ribs 52b and 52c, respectively, is a simple, relatively easy operation inasmuch as the open design of the chord members and cap strips mentioned provides easy access for the welding tongs which can be inserted from the rear or from the bottom between the ribs to straddle the individual ribs, it being observed that there are no obstructions of any kind to interfere with this operation.

The bottom skin blanket 56 is next properly positioned and securely clamped in position in the jig and held in its final form in the same manner as the top blanket. In this position, as shown in Fig. 45, the forward edge of blanket 56 overlaps the spanwise-extending bracing member 83 and nose skin 68 and is spot welded thereto at the desired spaced intervals, the welding tongs in this case straddling the skin blanket 56, one tong of which is disposed from the rear through the open spaces between the skin blankets and the ribs. This is followed by spot welding the clips 218 to the lower chord element 122 of ribs 52a, the lower cap members 144 of the two reinforced ribs 52b and the lower cap member 160 of the inboard rib 52c, in the same manner as described in connection with the upper skin blanket 54.

Since the shear web 58 is not yet in position, easy access is had for the performance of these welding operations through the spaces at the rear between the skin blankets and between the adjacent ribs.

It is believed opportune at this point to refer to the advantages in the assembly operation of the reinforcing and attaching structure for the skin blankets. It is to be noted that the attaching clips 218 are disposed parallel to and in overlapping relation with the vertical sides of the chordwise-extending ribs. This is extremely advantageous in that close tolerances in the clip formation and rib contour need not be maintained since in the present invention the skin blankets are clamped in position and as a result the clips 218 are spot welded to the ribs at whatever position they are in after the blankets and ribs are clamped in their proper relative positions. Moreover, the spot welds which attach the clips 218 to the ribs are in shear relation with respect to the vertical stresses as well as to the horizontal chordwise stresses. This is advantageous in that tension stresses on the spot welds are minimized.

The next step in the assembly operation is that of mounting and securing the spar or shear web 58 in position. The shear web 58 is so disposed that the slots 182 are in alignment with the ribs 52a, 52b and 52c and then disposed between the edges of the skins 210 which project beyond the reinforcing elements 212. The shear web is then moved forwardly so that when it is clamped in its final position the trailing ends of the ribs 52a and 52c project into the slots 182, formed by the shear web flanges 184, with each rearward end overlapping one of the shear web flanges 184. Also, the rearward ends of the reinforced ribs 52b, in this position of the shear web, fit closely between the vertical flanges 290 of the rear float mounting brackets 292, as shown in Fig. 14, the web 146 of the rib 52b engaging with the vertical flange of one of the brackets. This stage of assembly is shown in Fig. 46.

At this stage of the assembly operation a channel-shaped member 294 may be disposed in the space 182 between the plate member 162 of the rib 52c and the next adjacent flange 184, as shown in Fig. 21, so that the rib end is firmly held in position with respect to the shear web by means of the channel member 294. Also, Fig. 29, in connection with the ribs 52a with respect to which no trailing rib 62 is associated, similar channel-shaped members 294 are disposed in the spaces 182 to firmly hold the trailing end web portions 128 of these ribs against the overlapping flange 184. The channel members 294 may then be welded to the flanges 184, the one side of each channel through the projecting portions of the adjacent rib. Also, at this time a similar welding operation is performed in connection with the channel members 294 associated with the rib 52c, and at this time the splice plates 157 may be welded to the shear web.

The web 146 of the rib 52b (Figs. 10 and 14) and the splice channels 148 of the rib 52b may be welded to one of the flanges 290 of the brackets 292.

Finally, at this stage of the assembly, the flanges 178 of the upper and lower shear web chord members 176 are spot welded to the trailing edges of the skin blanket sheets 210 and through strips 296 extending rearwardly from the skin sheets 210.

The trailing ribs 62 have not as yet been assembled and, as seen from Figure 46, the shear web 58 merely closes in the spaces defined by the ribs and skin blankets. Accordingly, since there are no obstructions of any kind the spot welding necessary in connection with the shear web 58 may be accomplished with great dispatch, especially since the structural elements to be secured together are of open stringer construction providing ready access for the welding apparatus.

The trailing ribs 62 may then be disposed in position. These ribs are also so designed as to be received in the spaces 182 of the shear web, as shown in Figs. 27 and 28. It is to be noted (Figs. 5 and 27) that certain of the ribs 62 in effect form continuations of the ribs 52a and that, in this connection, the strut 256 of the particular rib 62, similarly to 294, firmly holds the trailing end of the web 128 of the rib 52a against one of the flanges 184. After the ribs 62 are placed and clamped in their proper positions, they are welded to the flanges 184, as indicated in these latter views, it being observed in Figs. 27 and 28 that the vertical members 256 thereof are channel-shaped, which facilitates the welding operation.

The next step in the assembly operation is that of providing the trailing ribs 62 with the desired skin covering 300. As here shown, the skin covering 300 is of fabric and it may be secured in any suitable manner to the projecting strip members 296, shown in Fig. 5, which are welded to the trailing edges of the skin blankets 54 and 56.

The forward structure of the wing carries the most of the load and the trailing ribs 62 and covering 300, therefore, function mainly as a means for streamlining the forward structure. Therefore, because of the fact that only a small portion of the load is carried by the trailing portion, the covering 300 may be of fabric, it being understood, however, that thin sheet metal may be employed, if desired.

The stub spar or shear web 60 which extends in an inboard direction from the rib 52c may be inserted at any time during the assembly after the rib 52c is once in position. The stub spar 60 is spot welded to the skin blankets and to suitable securing flanges 310 carried by the rib 52c.

The final step in the assembly operation is that of mounting the wing tip 64. This is accomplished by bolting, by means of the bolts 302, the series of upper and lower members 262 and 264 to the brackets 238, shown in Figs. 36 to 40, inclusive. After this is accomplished a suitable closure strip 304 is disposed to close the space 306 through which the bolts 302 have been inserted and tightened. Various manners of mounting this strip may be employed.

One of the advantageous features of the method of assembly just described is that all of the subassemblies; namely, the leading edge assembly 50, the ribs 52a, 52b and 52c, the skin blankets 54 and 56, the main spar 58, the stub spar 60, the trailing ribs 62 and wing tip 64, can each be fabricated and assembled apart from each other in separate jigs and the like, thus greatly facilitating mass production. The assembly of each subassembly is also greatly facilitated because all of the structural elements thereof are of the open stringer type, providing ready access for the welding tongs and other welding apparatus to the parts to be spot welded.

The assembly operation itself is carried out with a minimum number of steps or stages with great dispatch and with ease because, as in the case of the subassemblies, unobstructed access is had at all times to the parts of the subassemblies to be united by spot welding. It is to be noted that with respect to all connections there is adequate open space for the insertion of the welding tongs or the like to perform the spot welding operations. Whereas in previous constructions it has been the practice to build up the various parts around the spar or spars, the present invention, as has been described, contemplates the assembly of the spar or shear web during the final stages of assembly which is particularly advantageous in that it provides for greater freedom of access to the other parts for performing the welding operations.

From the standpoint of structure a box or D-type beam having a stressed skin covering is provided by the ribs, the main and stub spars and the skin blankets, in which all of these parts function together as a unitary structure or beam in the transfer of the shear, torsion and bending stresses to the aircraft. The coordinated strength of these parts allows the use of a minimum number of ribs and allows for the lightening of the individual structural elements to a degree which has not been possible heretofore, which, as is well known, is advantageous structurally and economically.

Another advantageous feature is that the parts are so arranged that the entire beam can be efficiently and economically fabricated from sheet metal parts and spot welded together, not only eliminating the use of objectionable bolts and rivets, but also providing for a simplified, sturdier, more rigid structure. It is to be understood, of course, that riveting and other means of securing may be employed where desired.

The present invention provides for the transfer of shear stresses from the nose of the wing structure which in itself functions as a flat plate truss through the use of the discontinuous intercostal stiffeners 118.

The forward load carrying portion of the wing structure is in the form of a D-type beam, having associated therewith at the root end in advance of the main spar a stub shear web and a shear transfer rib. The shear transfer, by means of this arrangement, is mutually adjusted at the root portion to concentrate the shear loads at desired points of attachment to the aircraft in question, the flow of the shear stresses being indicated by the arrows in Figure 41.

It is to be noted further that the spin supporting channel members and stringers extend substantially parallel to the leading edge of the wing in which there is the greatest amount of curvature, thereby providing for the least amount of distortion.

The skin blanket itself, in which a portion of the stresses are carried, is so arranged as to provide for quick and convenient attachment to the ribs without regard to the narrow limits of manufacturing tolerances heretofore required in the attaching parts, and also is provided with a new and improved means for attachment to the aircraft.

Another advantageous feature of the skin blanket described is that the attaching clips are so arranged that the reinforcing channels or corrugations can be secured to the skin sheet by a roller welding operation without the necessity of removing the roller during the welding operation to skip over an attaching clip. Also, in this construction the attaching clips may be welded to the stringer flanges either before or after attachment of the skin.

The invention may be embodied in other specific forms without departing from the spirit or characteristics thereof. The embodiment shown in the drawings is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In an aircraft structure, a load carrying element comprising upper and lower members, a corrugated sheet metal web extending between said members, means rigidly securing the bottoms of said corrugations at the ends thereof to said upper and lower members, the tops of at least some of said corrugations being deformed between the sides thereof into the plane of said bottoms, and means for securing said deformed tops to said upper and lower members.

2. In an aircraft structure, a load carrying element having top and bottom members, a sheet metal member extending between said members and having transverse corrugations therein, each of said corrugations at the ends thereof having its top depressed between its sides into the plane of the bottom thereof, and spot welds rigidly securing said depressed tops and said bottoms to said top and bottom members, said depressed and secured top portions reinforcing the sides of said corrugations against torsion deflections.

3. In an aircraft wing structure having a plurality of ribs and a spanwise-extending spar, means for connecting said ribs and spar, each said means comprising spaced metallic wall portions on said spar for receiving the trailing end of an adjacent rib terminating substantially at the spar, and separate metal means disposed in said space in engagement with one of said wall portions and positioning said trailing end against the other of said wall portions, and spot welds integrally uniting said metal means and last-mentioned wall portion through said trailing end and further uniting said metal means and the other wall portion.

4. In an aircraft wing structure having a plurality of ribs and a spanwise-extending spar, means for connecting said ribs and spar, each said means comprising spaced flange-like portions of substantial depth carried by said spar and receiving the trailing end of a rib in the space therebetween, a metallic channel member disposed in said space with one side portion engaging one of said flange-like portions and its other side portion engaging said trailing rib end and holding said rib end in firm engagement with the other of said flange-like portions, and means rigidly securing said rib end and last-mentioned side and flange-like portions together.

5. In an aircraft wing construction having a plurality of specific metallic ribs, a plurality of metallic trailing ribs and a spanwise-extending metallic spar, means for attaching said ribs to said spar, each said means comprising spaced wall portions on said spar receiving from one side the trailing end of a specific rib and from the other side the leading end of a trailing rib in overlapping relation in the space therebetween, and means for rigidly securing said wall portions to said overlapping ribs.

6. In an aircraft structure having a stress-transfer member of corrugated sheet metal provided with an opening therethrough, means for reinforcing the peripheral portion of the corrugated metal defining said opening comprising an annular sheet metal member of step-shape cross-section having an outer step portion engaging the bottoms of the corrugations terminating at said opening, a riser portion extending within said opening and an inner step portion disposed substantially in the plane of the tops of said corrugations, and a second annular sheet metal ring engaging the tops of said corrugations and having marginal portions extending into certain of said corrugations and engaging the bottoms of said last-named corrugations at the sides opposite said outer step portion, said outer step portion being securely welded to the bottoms of said corrugations and to said marginal portions through said certain corrugations.

7. In an aircraft structure, a load-carrying element comprising a pair of spaced cap strips having their outer margins curved to conform to an airfoil section and having their inner margins of web-form extending rectilinearly, a pair of rectilinear chord members, respectively, overlapping the inner web form margins of the cap strips and secured thereto, a corrugated web overlapping at the ends of the corrugations thereof the inner web-form margins of the cap strips and secured thereto, and angular members connecting the ends of the corrugated webs on the sides remote from the cap strips to the web portions of the respective cap strips.

8. In an aircraft structure, a load-carrying element comprising a pair of spaced cap strips having their outer margins curved to conform to an airfoil section and having their inner margins of web-form extending rectilinearly, a transversely corrugated web interconnecting said cap strips and having its ends overlapping the inner web-form margins of the cap strips and secured thereto through the bottoms of the corrugations, and a pair of rectilinear angular members, one flanking each of the rectilinear inner web-form margins of the cap strips and secured, through one arm thereof, to the adjacent margin of the cap strip and through another arm thereof to the adjacent ends of the corrugated web on the side thereof remote from the adjacent margin of the cap strip.

9. A load-carrying airfoil member, such as rib, comprising a pair of spaced interconnected chord members, a web overlapping the chord members and secured thereto in the overlap, the outer portions of the web extending beyond the chord members conforming to the airfoil surface contour, a corrugated sheet secured to the web between the chord members with the corrugations extending between and secured to the chord members, said chord members forming with the web inwardly facing channels telescoping over the ends of the corrugations of the sheet and having stiffening flanges projecting laterally of the web.

10. A load-carrying airfoil member, such as a rib, comprising a web having marginal supporting edges conforming to the airfoil surface contour, chord members secured to said web at one side thereof at a distance inward from each contoured edge, strut elements secured to the side of the web opposite said chord members and in the zone of and between said chord members, and other chord members on the strut side of the web in the zone of the first chord members secured to the ends of said strut elements.

11. A load-carrying airfoil member, such as a rib, comprising a plate web having marginal flanged supporting edges conforming to the airfoil surface contour, a depthwise corrugated sheet of materially less width than the distance between the contoured edges of said web secured to the web, and chord members secured to the web and to the corrugations at the ends of said corrugated sheet and embracing the ends of the corrugated sheet.

12. A load-carrying airfoil member, such as a rib, comprising a plate web having marginal supporting edges conforming to the airfoil surface contour, a depthwise corrugated sheet of materially less width than the distance between the contoured edges of said web secured to the web, and chord members secured to the web at the ends of said corrugated sheet on both sides of the plate web.

13. A load-carrying airfoil member, such as a rib, comprising a plate web having marginal supporting edges conforming to the airfoil surface contour, a depthwise corrugated sheet of materially less width than the distance between the contoured edges of said web secured to the web, and chord members secured to the web at the ends of said corrugated sheet on both sides of the plate web, said chord members on the corrugated sheet side of the plate web comprising elements secured to the plate web and elements secured over the corrugated sheet.

MICHAEL WATTER.